W. H. KENNEDY.
RIVETING MACHINE.
APPLICATION FILED MAR. 5, 1918.

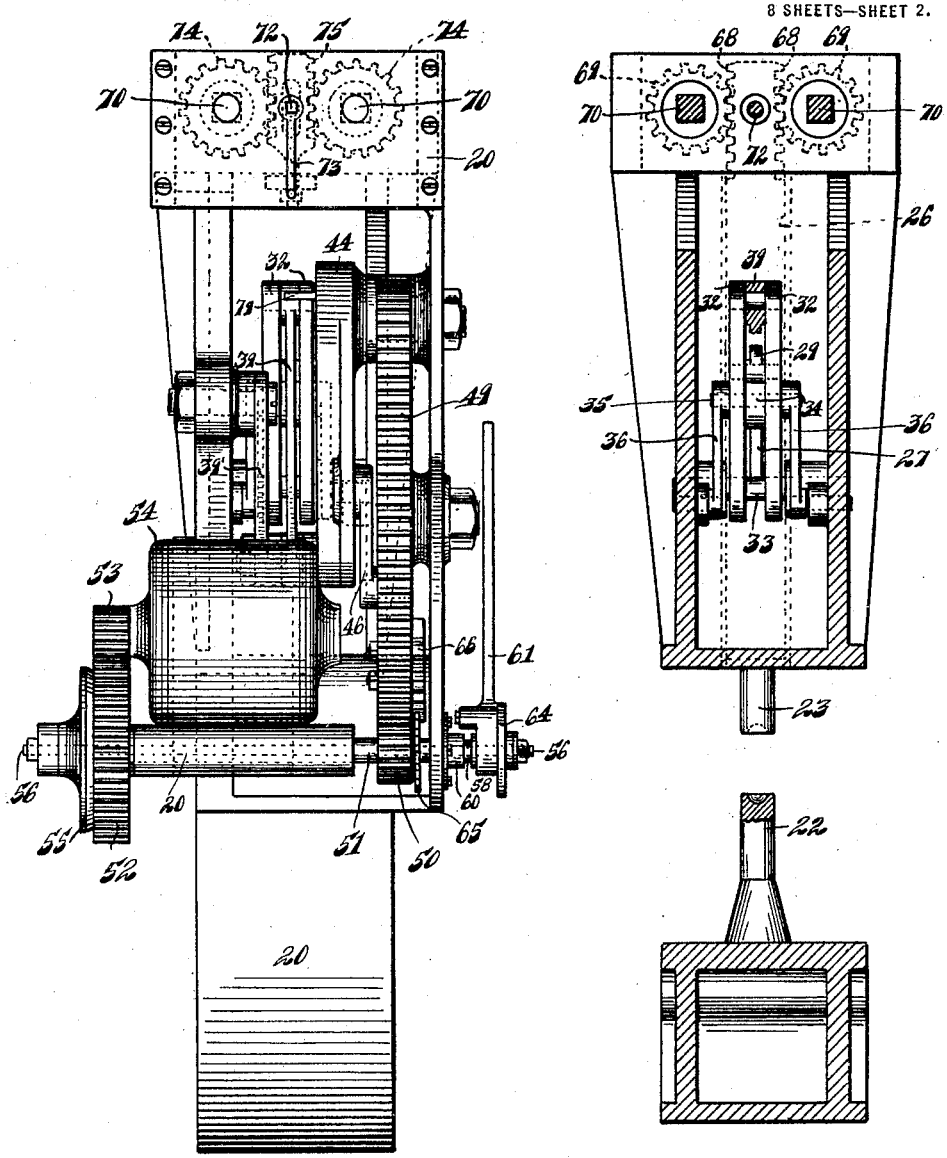

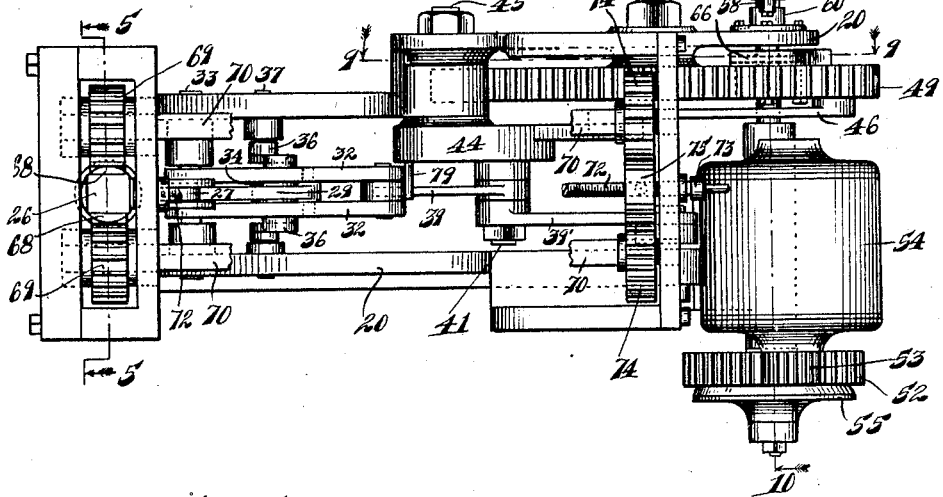
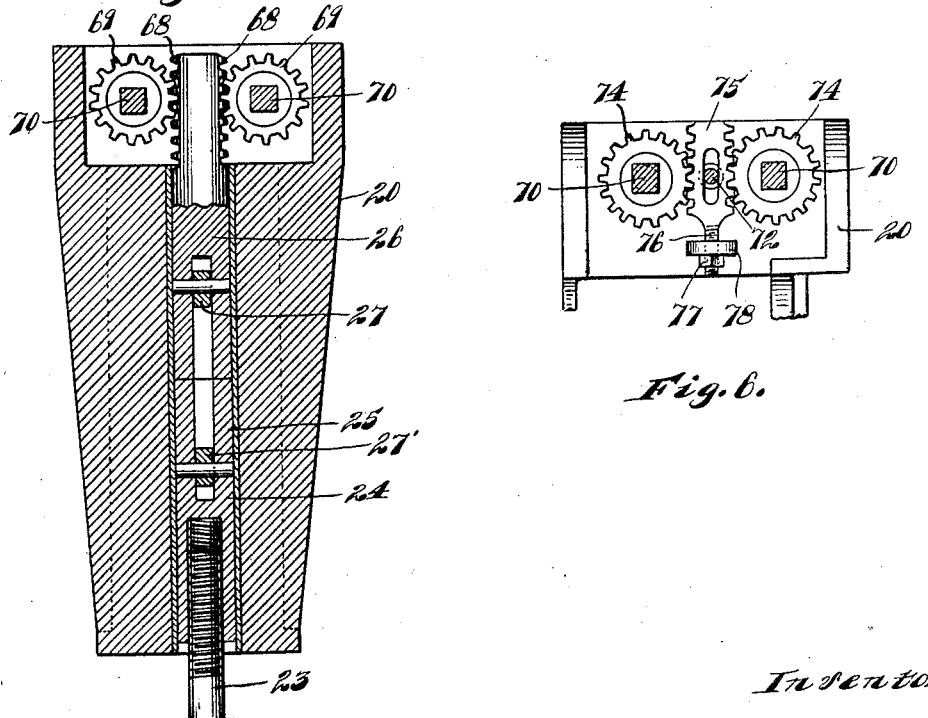

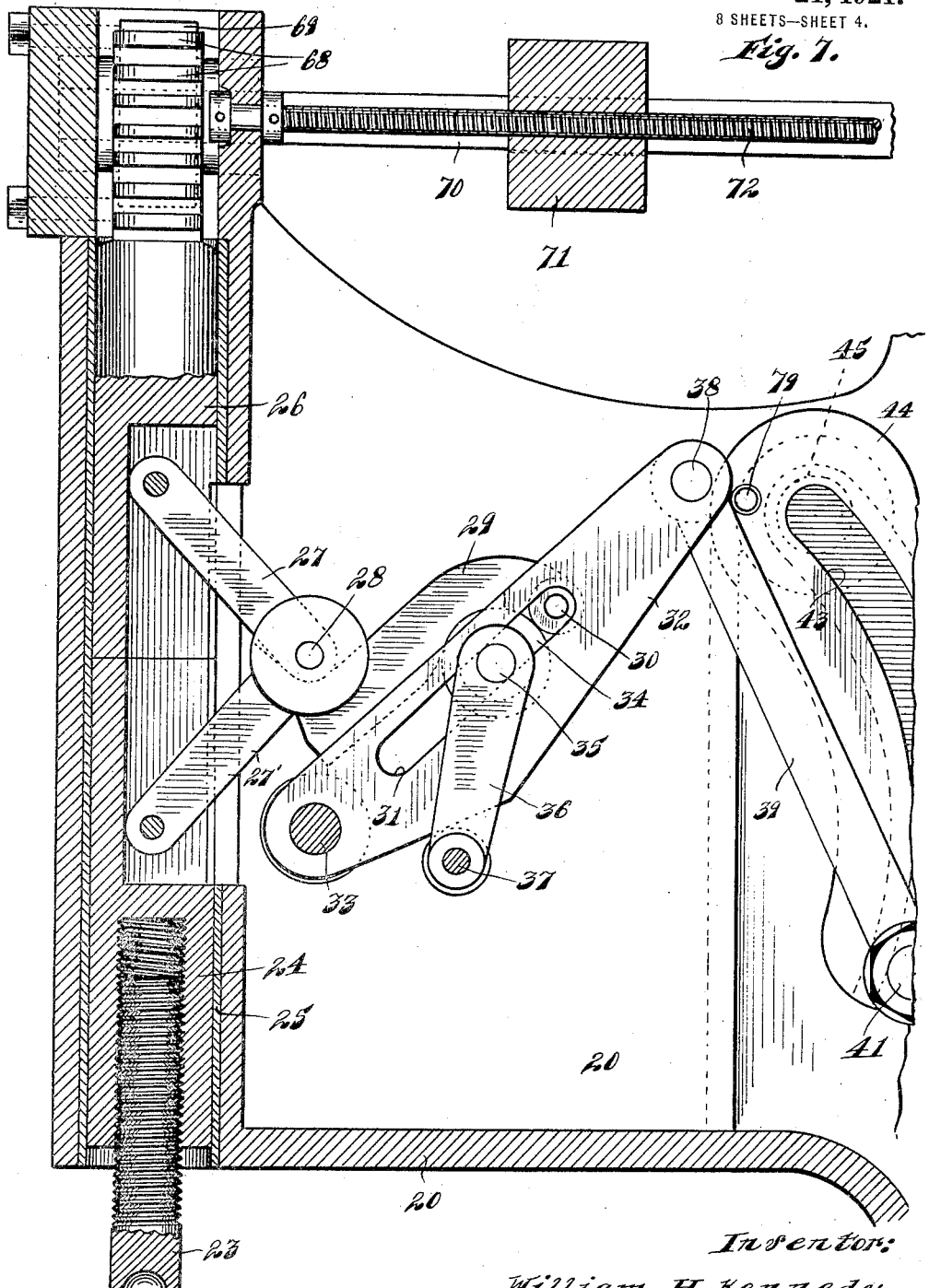

1,382,293.

Patented June 21, 1921.
8 SHEETS—SHEET 5.

Inventor:
William H. Kennedy,
By Joshua R H Potts
his Attorney.

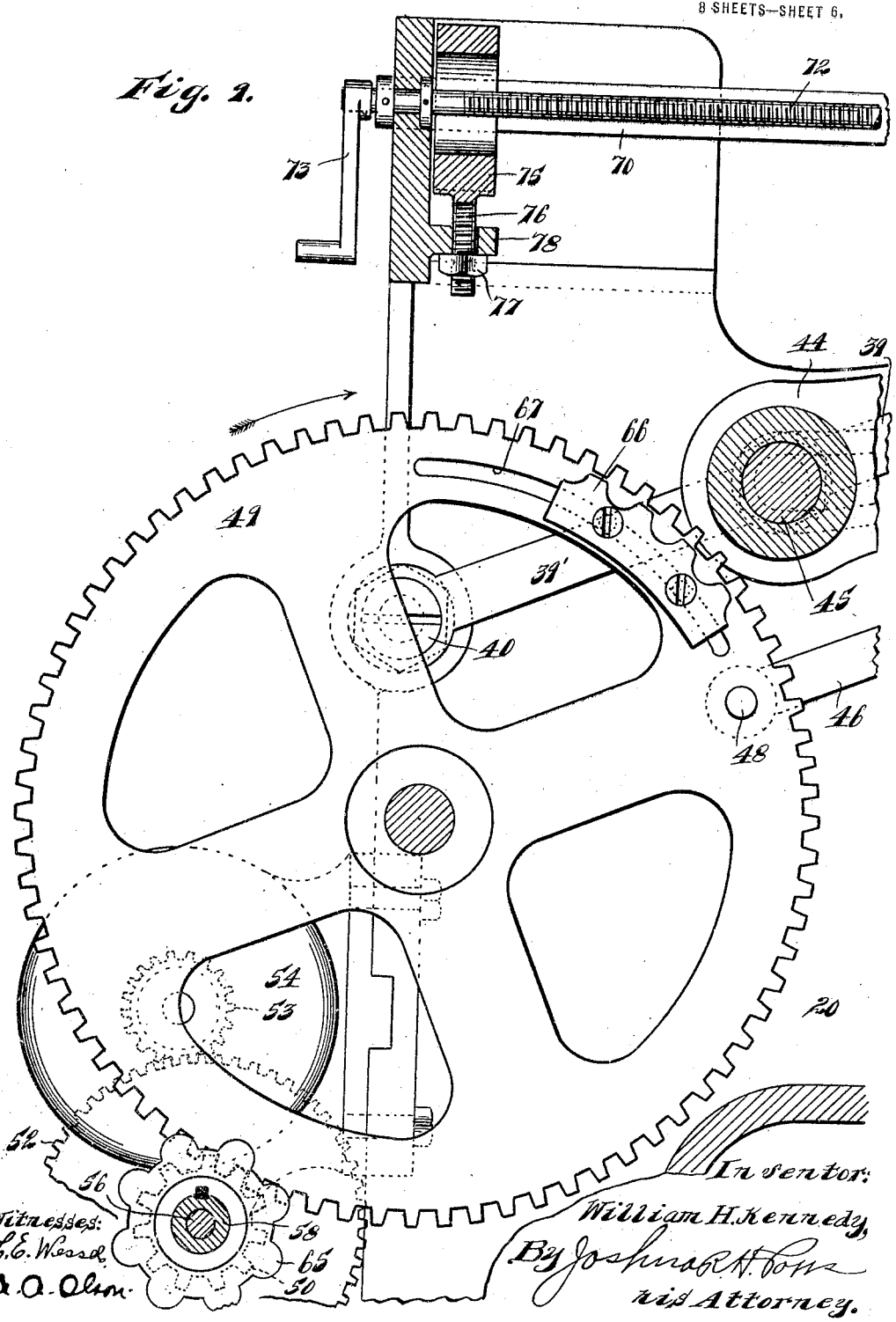

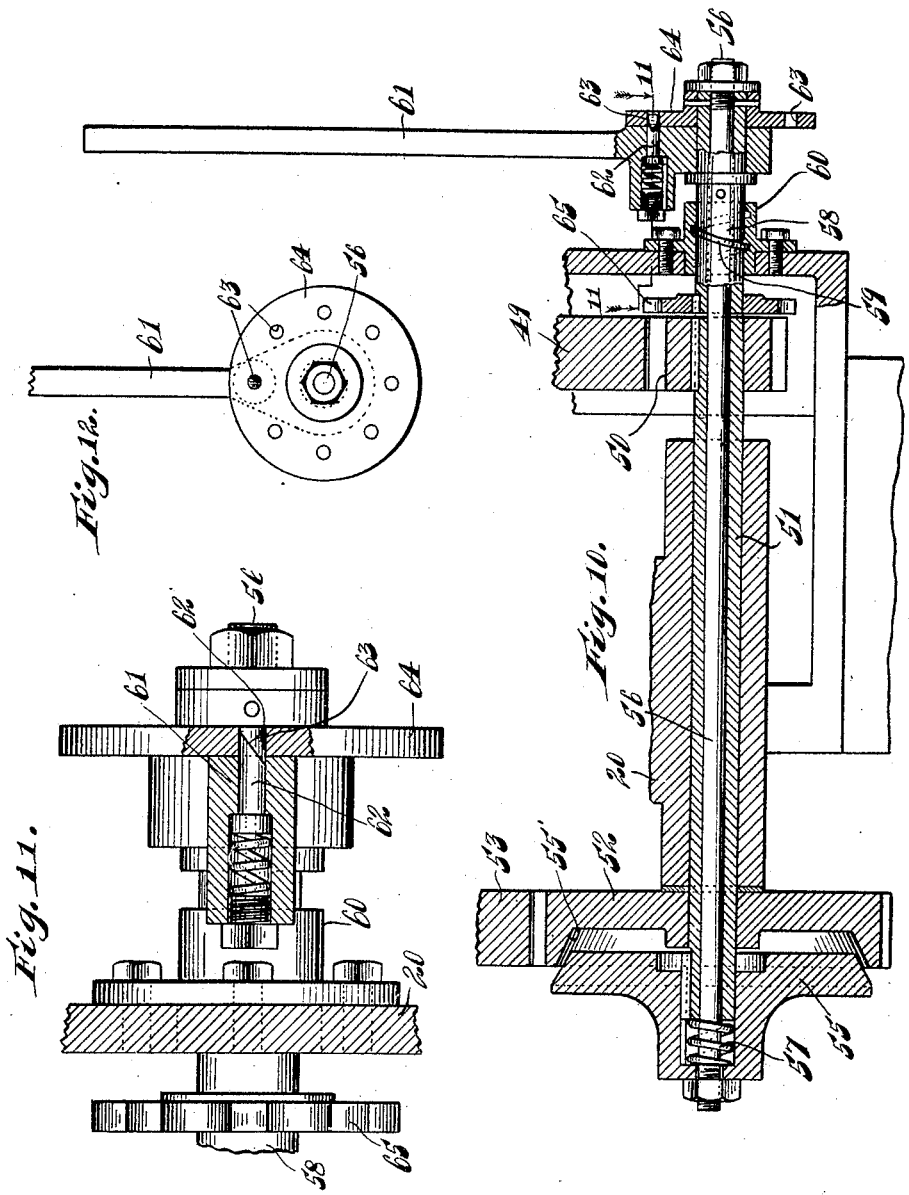

W. H. KENNEDY.
RIVETING MACHINE.
APPLICATION FILED MAR. 5, 1918.
1,382,293.
Patented June 21, 1921.
8 SHEETS—SHEET 8.
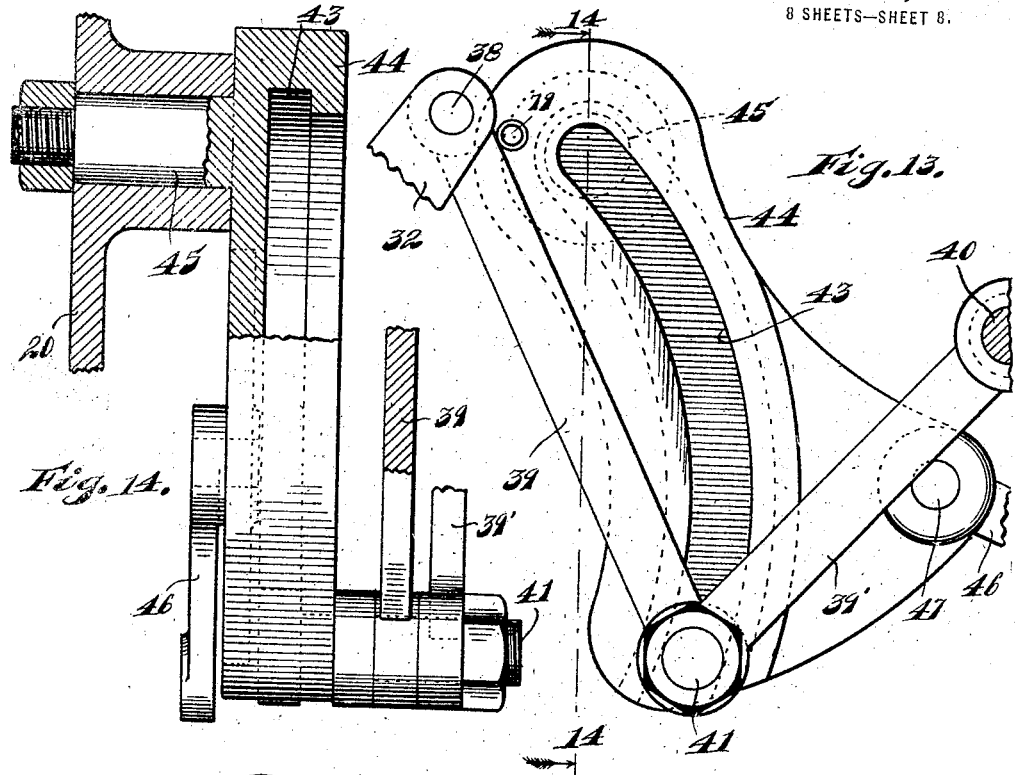
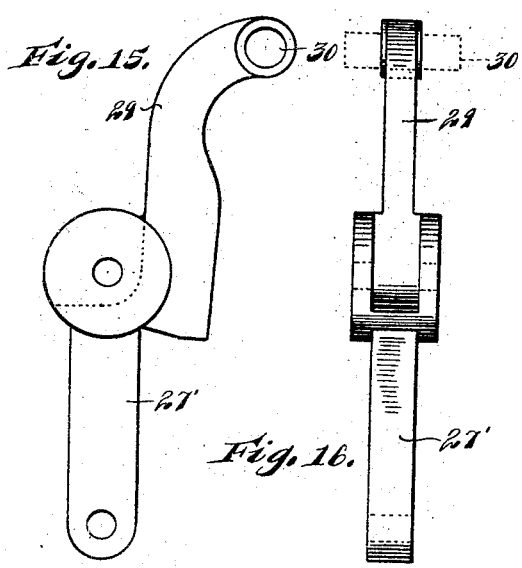
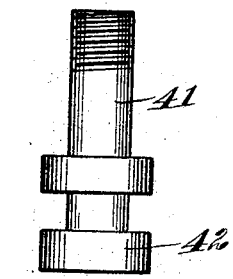
Witnesses:
C. E. Wessels
A. A. Olson
Inventor:
William H. Kennedy,
By Joshua R. H. Potts
his Attorney.

UNITED STATES PATENT OFFICE.

WILLIAM H. KENNEDY, OF CHICAGO, ILLINOIS, ASSIGNOR OF ONE-HALF TO LEWIS B. MILLER, OF CHICAGO, ILLINOIS.

RIVETING-MACHINE.

1,382,293.     Specification of Letters Patent.     Patented June 21, 1921.

Application filed March 5, 1918. Serial No. 220,466.

*To all whom it may concern:*

Be it known that I, WILLIAM H. KENNEDY, a citizen of the United States, and a resident of the city of Chicago, county of Cook, and State of Illinois, have invented certain new and useful Improvements in Riveting-Machines, of which the following is a specification.

My invention relates to improvements in riveting machines, and has for its object the production of a device of this character through the medium of which rivets may be applied without pounding, such as is the case with riveting machines now generally in use.

A further object is the production of a riveting machine, which may be readily and easily operated and which will be of economical construction and highly efficient in use.

Other objects will appear hereinafter.

The invention consists in the combinations and arrangements of parts hereinafter described and claimed.

Figure 1:
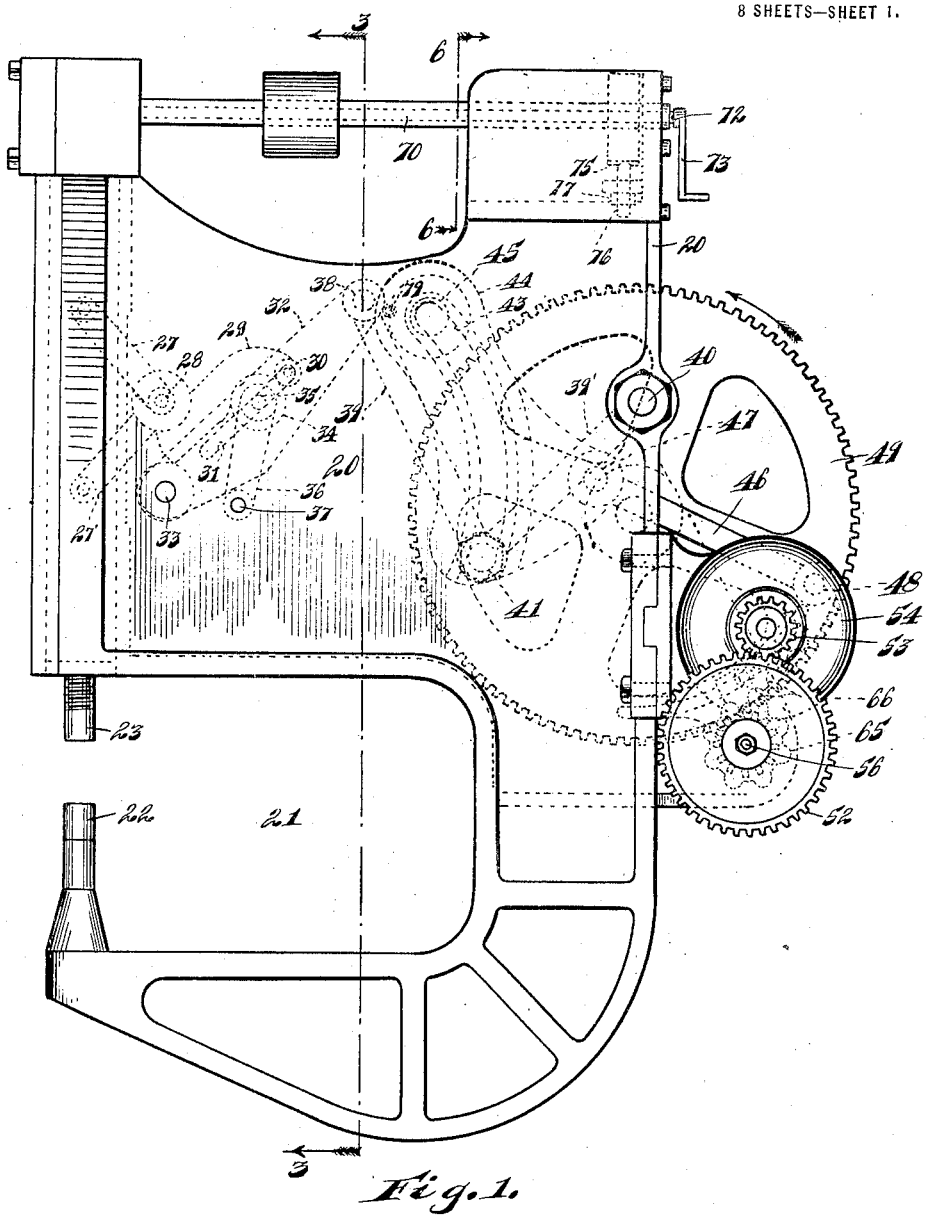
Figure 8:
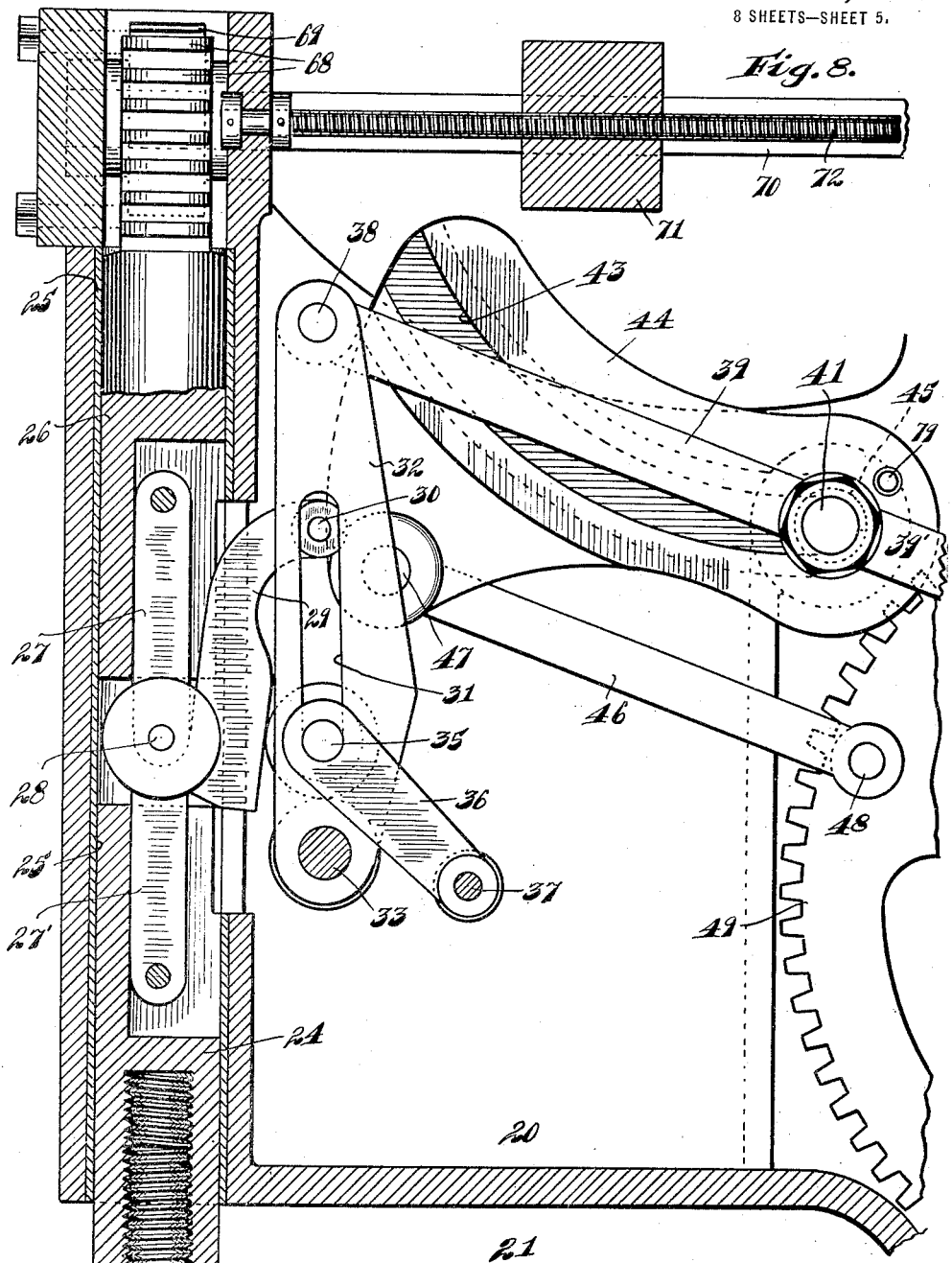

The invention will be best understood by reference to the accompanying drawings forming a part of this specification, and in which, Figure 1 is a side elevation of a riveting machine embodying the invention, Fig. 2, a rear elevation thereof, Fig. 3, a section taken on line 3—3 of Fig. 1, Fig. 4, a top plan view of the machine, with parts broken away to expose underlying parts, Fig. 5, a section taken on line 5—5 of Fig. 4, Fig. 6, a section taken on line 6—6 of Fig. 1, Fig. 7, an enlarged sectional view showing the system of levers employed in actuating the movable jaw of the machine, the parts, in this view, being shown in the position assumed thereby when the movable jaw is in retracted or inoperative position, Fig. 8, a view similar to Fig. 7 showing the position assumed by the parts when the movable jaw is in operative position, Fig. 9, an enlarged fragmental section taken on substantially line 9—9 of Fig. 4, Fig. 10, an enlarged section taken on substantially line 10—10 of Fig. 4, showing the clutch mechanism employed for connecting the riveting mechanism with the motor employed in conjunction therewith, Fig. 11, an enlarged detail section taken on line 11—11 of Fig. 10, Fig. 12, a front elevation of the control lever of the machine, seen in Fig. 10, Fig. 13, an enlarged detail side elevation of the oscillatory cam member and associated parts which form a part of the system of levers used to actuate the movable jaw of the machine, Fig. 14, a section taken on line 14—14 of Fig. 13, Fig. 15, a side elevation of one of the toggle levers of the construction, Fig. 16, a side elevation of Fig. 15, and Fig. 17, a detail of the bolt or pin which coöperates with the cam member shown in Fig. 13.

The preferred form of construction as illustrated in the drawings comprises a suitable frame 20, the lower end of which is cut away at 21 for the accommodation of relatively stationary and movable riveting jaws 22 and 23 respectively. The relatively movable jaw 23, best seen in Figs. 7 and 8, is threaded into a piston 24 which is slidably mounted in a cylinder 25 formed in the upper portion of frame 20. The threading of said jaw 23 into the member 24 of course permits of adjustment of the same toward and from the jaw 22 in order to adapt the device for use in connection with work of various thicknesses or rivets of various lengths.

Also mounted in the cylinder 25 is a piston 26, the pistons 24 and 26 being connected by a toggle 27—27', the terminals of which are pivotally connected with said pistons. The end of the toggle lever 27' at the knee-joint 28 is formed with an extension 29 having a laterally projecting pin 30 at its outer end which slidably engages in elongated slots 31 of a pair of similar spaced levers 32, which are fulcrumed at 33 in the frame 20. The toggle lever 27' is best seen in Figs. 15 and 16. Coöperating with the extension 29 is a roller 34 which is arranged between the levers 32, the ends of the shaft 35 of said roller, loosely engaging in the slots 31 of said levers. Said ends of roller shaft 35 are also mounted in the free ends of arms 36, which are fulcrumed at 37 in frame 20. The arrangement is such that when the levers 32 are rocked upwardly or to the left, as seen in Fig. 7, the roller 34 will move downwardly relatively thereto, pressing against the adjacent side of the extension 29, thus causing the toggle 27—27' to be rocked to operative or dead center position, as seen in Fig. 8. Upon the return rocking of the levers 32, the pins 30 engaging with said levers, will cause the toggle 27—27' to be moved out of dead center position, the toggle being moved toward folded position or back to the initial position, as seen in Fig. 7. The free ends of levers 32 are connected at 38 with one end of a toggle 39—39', the opposite end of said toggle 39—39' being fulcrumed at 40 to the frame 20. The toggle 39—39' is so arranged that rocking of the levers 32 as above described, will be effected upon folding and unfolding of said toggle. The knee-joint of the toggle 39—39' is constituted by a bolt or pin 41, best seen in Figs. 13 and 17. Said bolt 41 is formed with a head 42 which slidably engages in a curved slot 43 of T-form in cross section, which is formed in one side of a cam member 44, fulcrumed at one end in the frame 20. The fulcrumed end of said cam member is formed with an integral stud 45, best seen in Fig. 14, which is pivotally mounted in the frame 20, the oscillation of said cam being about the stud 45.

Rocking of the cam 44 is effected by means of a link 46, one end of which is connected at 47 with said cam, the other end thereof being connected at 48 with a gear 49 rotatably mounted in frame 20. The gear 49 meshes with a pinion 50 which is fixed to a tubular shaft 51 rotatably mounted in suitable bearings at the rearward side of frame 20, as best seen in Fig. 10. Loosely mounted upon the shaft 51 is a gear 52 meshing with a gear 53 which is carried by the power shaft of a suitable electric motor 54 mounted at the rearward side of frame 20. Splined to the shaft 51 is a cone clutch 55 which is adapted to engage in a seat 55' formed in one side of the gear 52. The clutch 55 is moved into and out of engagement with the seat 55' by means of a rod 56 slidably mounted in the tubular shaft 51, a helical compression spring 57 being provided to take up any lost motion and to normally hold said clutch in inoperative position. The arrangement is such, as will be seen, that operative connection between the shaft 51 and the motor will be effected only when the clutch 55 is moved into engagement with the seat 55' in gear 52.

To effect this movement of clutch 55 the rod 56 is provided at its opposite end with a sleeve 58 having a thread 59 of very steep pitch formed thereon. The thread 59 engages with an internal thread formed in a collar 60 rigidly fixed to an adjacent portion of the frame 20. With this arrangement it will be seen that by rotating the sleeve 58 or the rod 56, the latter will be caused to move longitudinally and thus the clutch carried thereby into or out of operative position as the case may be. This rotary movement of sleeve 58 is effected by means of a pivotally mounted lever 61 carrying a spring pressed pawl 62, which is adapted to engage with any one of a plurality of spaced openings 63 formed in a plate 64 which is fixed to said sleeve 58. With this arrangement the lever 61 may be adjusted to any position desired, that is to extend upwardly, downwardly or sidewise so as to be most conveniently positioned with the machine in any position in which the same may be employed. The outer end of the pawl 62 is beveled at 62', as clearly seen in Fig. 11, so that the lever may be swung in a counter-clockwise direction or backwardly without interruption to any position desired, the pawl dropping into engagement with the corresponding opening 63 in the adjusted position of the lever. With the arrangement set forth, it will be seen that upon clockwise rotation of said lever, the sleeve 58 will be rotated in a direction to cause rod 56 to be moved to the right, as seen in Fig. 10, and hence the clutch 55 to be moved to operative position, the pitch of the thread 59 being such as to hold the clutch in operative position against the action of the spring 57 when the lever 61 is released.

To effect release of said clutch the sleeve 58 is provided at its inner end with a gear 65 which is fixed thereto, said gear being best seen in Fig. 9. Provided upon one side of the gear 49 is a segmental rack 66, said gear having an elongated slot 67 to permit of shifting of said gear segment to obtain the timing desired in the throwing off or stopping of the machine. The arrangement is such, as will be seen, that in the rotation of the gear 49, the gear segment 66 will, at a certain point in the rotation of said gear, engage with the gear 65 causing rotation thereof, and hence of the sleeve 58, the direction of the rotation thus imparted to said sleeve being such as to effect shifting of rod 56 to the left, as seen in Fig. 10, which of course results in release of clutch 55.

The upper end of the piston 26 coöperating with the movable jaw of the machine, is formed at opposite sides with rack teeth 68, as best seen in Figs. 4 and 5. The teeth 68 mesh with gears 69 fixed to rods 70 which are rotatably mounted in adjacent portions of frame 20, said rods extending across an opening formed in the upper end of the frame, as seen in Fig. 1. The portions of said rods 70, spanning said openings are square in cross section, and are connected by a yoke or cross head 71 which is slidably mounted thereon, the openings through said head 71 being of such form however, as to snugly embrace said rods.

The arrangement is such, as will be seen, that in the operation of the machine, when the toggle 27—27' is moved to operative position, the pressure of the jaw 23 against the work will be resisted by the pressure of the piston 26 exerted by the rack teeth 68 upon the gears 69. Rotation of said gears is resisted by the rods 70, the rotation permitted being only such as is allowed by said rods through twisting or torsional distortion thereof. It will thus be seen that when the upward pressure upon the piston 26 exceeds the torsional resistance of the rods 70, said piston will yield and thus allow for slight corresponding yielding of the jaw 23. This arrangement is in the nature of a safety device, to guard against breakage of the machine, due to failure to adjust the jaw 23 to work of increased width or a rivet of increased length. With the arrangement set forth, in the event of failure to adjust the same to the increased size of the work, upon actuation of the toggle 27—27', the piston 26 will yield sufficieny to prevent breakage of any of the parts. The twisting of the rods 70 takes place between the gears 69 and the yoke 71, and in order to adjust said yoke so as to adjust the torsional resistance of said rods, a screw 72 is provided, threaded into said yoke and provided at one end with a crank handle 73. In order to take up any lost motion in case of wear on the rods or the openings in yoke 71, the rods 70 are provided at their opposite ends with gears 74 similar to the gears 69, as seen in Fig. 6. With the gears 74 meshes a rack 75 having a reduced lower portion 76 upon which is threaded a nut 77 adapted to engage against a stationary lug 78 through which the portion 76 passes. By tightening the nut 77, it will be seen that the rack 75 may be drawn downwardly in order to apply torsional pressure to the rods 70 in a direction opposed to that to which said rods are subjected in the upward movement of the piston 26 above described.

In the operation of the machine the same is first adjusted to a position in which the jaws 22 and 23 engage with the opposite ends of the rivet to be operated upon. This having been done, the handle 61 is rotated in a clockwise direction, causing movement of the clutch 55 into operative position. When this is done, gear 49 will be rotated in the direction of the arrow in Fig. 1, by the motor 54 which had been previously started. With the gear 49 in the position seen in Fig. 1, upon rotation of said gear, as mentioned, the cam 44 will be rocked to the left about the stud 45. As said cam is thus rocked, the bolt 41 provided at the knee-joint of the toggle 39—39' will be caused to slide upwardly in the slot 43, thus causing said toggle to unfold or straighten out. This movement of said toggle causes rocking of the upper end of levers 32 to the left, which in turn, through the medium of roller 34, press against the extension 29 of the toggle lever 27', thus causing the toggle 27—27' to unfold or straighten out with the result that the jaw 23 is pressed toward the work. When the cam 44 reaches the terminal of its operative stroke, as seen in Fig. 8, the toggles 39—39' and 27—27' will be in dead center position, exerting a tremendous pressure upon the rivet. Said toggles will be permitted to remain in this position for a short period of time and hence the rivet acted upon is maintained under tremendous pressure so as to insure positive seating of the rivet and cooling of the same before being released. This holding of the parts for a short period in operative engagement with the rivet, is rendered possible by reason of the fact that when the toggle 39—39' is unfolded or in dead center position, the bolt 41 at the knee-joint therein will be in a position concentric with the axis of rotation of cam 44, as is shown in Fig. 8, so that upon the return rocking of said cam by the gear 49, said cam will have no effect upon the knee-joint of said toggle until a laterally projecting pin 79 upon said cam is brought into contact with the toggle lever 39 which will result in the knee-joint of the toggle being broken, causing the bolt 41 to move along the slot 43, back to initial position. The pin 79 is so positioned on said cam 44, as best seen in Fig. 8, that the same will not be brought into contact with the lever 39 until the cam 44 has rocked a considerable distance in counter-clockwise direction in Fig. 8, the duration of the period in which the machine remains in its operative condition clamped to the work, being determined by the time taken for the pin 79 to reach the lever 39, when said cam is rocked under the influence of the gear 49. With the system of levers employed, a tremendous leverage is developed between the source of energy or the motor and the movable riveting jaw, so that in the operation of said motor, the energy exerted thereby, will be many times multiplied before reaching the jaw 23, resulting in a tremendous pressure being applied to said jaw.

After the toggle 39—39' has been engaged and the knee-joint thereof broken, by the pin 79, as above described, the same will continue to be folded and hence the parts to which said toggle is connected, correspondingly actuated as the gear 49 continues to rotate. The rotation of said gear will continue until the gear segment 66 thereon engages with the gear 65, when disconnection of the operating mechanism from the motor will be automatically effected in the manner above described. When it is again desired to use the machine, connection of the operating mechanism with the motor is effected by actuation of the lever 61 in the manner above set forth.

The system of levers and gears used in connecting the motor with the movable riveting jaw may also be employed in other machines of a similar character, or machines in which one member or jaw is moved toward another, and I therefore do not desire to limit myself to the employment of this system of levers in a riveting machine.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A machine of the class described comprising relatively stationary and movable jaws; means for actuating said movable jaw comprising a toggle engaging with said movable jaw; a pivotally mounted lever coöperating with said toggle; and a second toggle for actuating said lever, substantially as described.

2. A machine of the class described comprising relatively stationary and movable jaws; means for actuating said movable jaw comprising a toggle engaging with said movable jaw; a pivotally mounted lever coöperating with said toggle; a second toggle for actuating said lever; and an oscillatory member for actuating said second mentioned toggle, substantially as described.

3. A machine of the class described comprising relatively stationary and movable jaws; means for actuating said movable jaw comprising a toggle engaging with said movable jaw; a pivotally mounted lever coöperating with said toggle; a second toggle for actuating said lever; an oscillatory member for actuating said second mentioned toggle; and power-driven rotary means for actuating said oscillatory member, substantially as described.

4. A machine of the class described comprising relatively stationary and movable jaws; means for actuating said movable jaw comprising a toggle engaging with said movable jaw; a pivotally mounted lever coöperating with said toggle; a second toggle for actuating said lever; and an oscillatory slotted member for actuating said second mentioned toggle, the knee-joint of said second mentioned toggle engaging the slot in said oscillatory member, substantially as described.

5. A machine of the class described comprising relatively stationary and movable jaws; means for actuating said movable jaw comprising a toggle engaging with said movable jaw; a pivotally mounted lever coöperating with said toggle; a second toggle for actuating said lever; and an oscillatory cam member engaging with the knee-joint of said second mentioned toggle for actuating the latter, substantially as described.

6. A machine of the class described comprising relatively stationary and movable jaws; means for actuating said movable jaw comprising a toggle engaging with said movable jaw; a pivotally mounted lever coöperating with said toggle; a second toggle for actuating said lever; and an oscillatory cam member with which the knee of said second mentioned toggle slidably engages and whereby said toggle will be unfolded when said member is moved in one direction, and folded when said member is moved in the opposite direction, substantially as described.

7. A machine of the class described comprising relatively stationary and movable jaw members; means for actuating said movable jaw comprising a toggle adapted, in the movement of said movable jaw to operative position, to assume a dead center position to lock said movable jaw in this position; an oscillatory cam member for actuating said toggle and adapted to move the same into dead center position; and means on said cam member for moving said toggle out of dead center position, substantially as described.

8. A machine of the class described comprising relatively stationary and movable jaw members; means for actuating said movable jaw comprising a toggle adapted, in the movement of said movable jaw to operative position, to assume a dead center position to lock said movable jaw in this position; an oscillatory cam member for actuating said toggle and adapted to move the same into dead center position; and a rotary element for actuating said cam member whereby, upon continuous movement of said element, said toggle will be moved into dead center position, permitted to remain in dead center position for a period of time, and then moved out of dead center position, substantially as described.

9. A machine of the class described comprising relatively stationary and movable jaw members; means for actuating said movable jaw comprising a toggle adapted, in the movement of said movable jaw to operative position, to assume a dead center position to lock said movable jaw in this position; an oscillatory cam member for actuating said toggle and adapted to move the same into dead center position; a rotary element for actuating said cam member whereby, upon continuous movement of said element, said toggle will be moved into dead center position, permitted to remain in dead center position for a period of time, and then moved out of dead center position, the axis of oscillation of said cam member being coincident with the point of connection of said cam member with said toggle, when said toggle is in dead center position, substantially as described.

10. A machine of the class described comprising relatively stationary and movable jaws; means for actuating said movable jaw comprising an oscillatory member having an elongated slot therein; a toggle having the knee-joint thereof slidably engaging said slot whereby, upon oscillation of said member, said toggle will be actuated, said knee-joint of said toggle being positioned coincident with the axis of oscillation of said member, when said toggle is on dead center and said member is at one terminal of its movement; and means for moving said toggle out of dead center position upon return movement of said member, substantially as described.

11. A machine of the class described comprising relatively stationary and movable jaws; means for actuating said movable jaw comprising an oscillatory member having an elongated slot therein; a toggle having the knee-joint thereof slidably engaging said slot whereby, upon oscillation of said member, said toggle will be actuated, said knee-joint of said toggle being positioned coincident with the axis of oscillation of said member, when said toggle is on dead center and said member is at one terminal of its movement; and means on said member for moving said toggle out of dead center position upon return movement of said member, substantially as described.

12. A machine of the class described comprising relatively stationary and movable jaws; means for actuating said movable jaw comprising an oscillatory member having an elongated slot therein; a toggle having the knee-joint thereof slidably engaging said slot, whereby, upon oscillation of said member, said toggle will be actuated, said knee-joint of said toggle being positioned coincident with the axis of oscillation of said member, when said toggle is on dead center and said member is at one terminal of its movement; means for moving said toggle out of dead center position upon return movement of said member and after said member has moved a predetermined distance, substantially as described.

13. A machine of the class described, comprising relatively stationary and movable jaws; a pair of toggle levers adapted to be brought into alinement for moving said movable jaw with respect to said stationary jaw; an operating lever pivotally mounted on an axis coincident with the position of the axis of the pivotal connection between said toggle levers at the time when said toggle levers are in alinement; means for effecting sliding engagement between said operating lever and the knuckle of said toggle levers whereby upon a swinging movement of the operating lever said toggle levers are moved into alinement; and means for moving said operating lever to and past the point where said toggle levers are brought into alinement, substantially as described.

14. A machine of the class described, comprising relatively stationary and movable jaws; a pair of toggle levers adapted to be brought into alinement for moving said movable jaw with respect to said stationary jaw; an operating lever pivotally mounted on an axis coincident with the position of the axis of the pivotal connection between said toggle levers at the time when said toggle levers are in alinement; means for effecting sliding engagement between said operating lever and the knuckle of said toggle levers whereby upon a swinging movement of the operating lever said toggle levers are moved into alinement; means for moving said operating lever to and past the point where said toggle levers are brought into alinement; and means for preventing the toggle levers from passing beyond their alined position, substantially as described.

15. A machine of the class described, comprising relatively stationary and movable jaws; a pair of toggle levers adapted to be brought into alinement for moving said movable jaw with respect to said stationary jaw; a longitudinally slotted lever pivotally mounted on an axis coincident with the position of the axis of the pivotal connection between said toggle levers at the time when said toggle levers are in alinement, said slot being centrally located with respect to the axis of the lever; a head carried by said toggle levers in concentric position with respect to their pivotal connection, said head being adapted to have a snug fit in the slot of said lever; means for swinging said slotted lever to and past the point where said toggle levers are brought into alinement; and means for limiting the movement of said head in said slot for preventing the toggle levers from passing beyond their alined position.

16. A machine of the class described comprising a jaw; and means for yieldingly holding said jaw in operative position comprising an elongated member adapted to be torsionally distorted in the rearward yielding of said jaw, substantially as described.

17. A machine of the class described comprising a jaw; means for yieldingly holding said jaw in operative position comprising a pair of elongated members adapted to be torsionally distorted in the rearward yielding of said jaw; and means for adjusting the operative length of said members, substantially as described.

18. A machine of the class described comprising a jaw; means for yieldingly holding said jaw in operative position comprising a pair of elongated members adapted to be torsionally distorted in the rearward yielding of said jaw; and a yoke slidably mounted on said members for adjusting the operative length of said members, substantially as described.

19. A machine of the class described comprising a jaw; means for yieldingly holding said jaw in operative position comprising a pair of elongated members adapted to be torsionally distorted in the rearward yielding of said jaw; a yoke slidably mounted on said members for adjusting the operative length of said members; and manually operable means for adjusting said yoke on said members, substantially as described.

20. A machine of the class described comprising a jaw; means for yieldingly holding said jaw in operative position comprising a pair of elongated members; gears on said members; and racks operatively connected with said jaw and meshing with said gears whereby, upon rearward yielding of said jaw, said racks will cause said gears to rotate against the torsional resistance of said members, substantially as described.

In testimony whereof I have signed my name to this specification in the presence of two subscribing witnesses.

WILLIAM H. KENNEDY.

Witnesses:
JOSHUA R. H. POTTS,
HELEN F. LILLIS.